H. HARRINGTON.
Breech-Loading Fire-Arm.
No. 297.
Patented July 29, 1837.
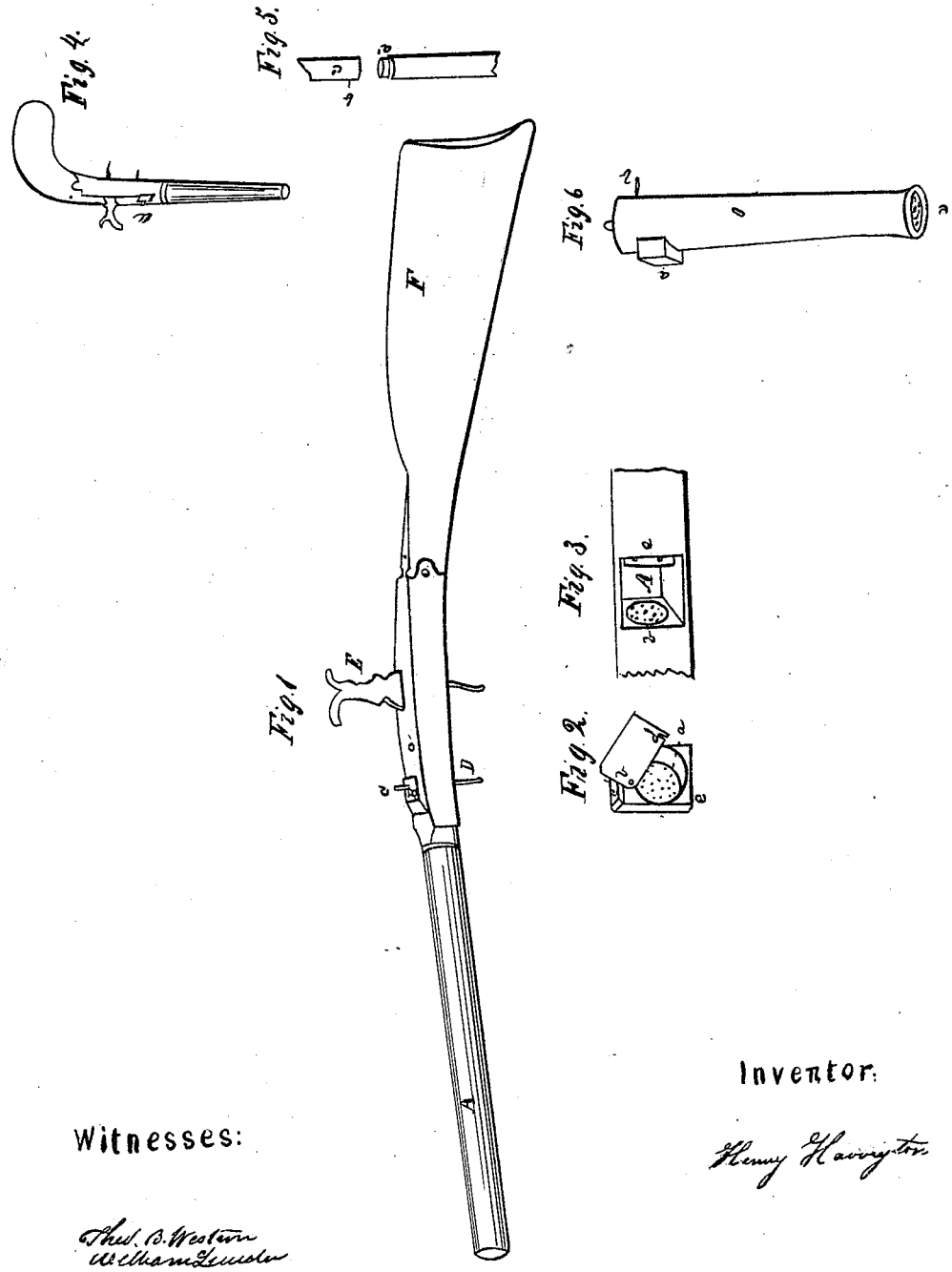

UNITED STATES PATENT OFFICE.

HENRY HARRINGTON, OF SOUTHBRIDGE, MASSACHUSETTS.

IMPROVEMENT IN FIRE-ARMS.

Specification forming part of Letters Patent No. 297, dated July 29, 1837.

*To all whom it may concern:*

Be it known that I, HENRY HARRINGTON, of Southbridge, in the county of Worcester and Commonwealth of Massachusetts, cutler, have invented a new and useful Improvement in Fire-Arms, called "Harrington's improvement in Guns, Pistols, and Cannon;" and I do hereby declare that the following is a full and exact description thereof.

The exterior barrel, of convenient bore and length, resembles the gun-barrel in common use. The interior is filled with several small barrels or tubes, each of the diameter of bore suited to receive one shot or ball of the size intended to be discharged. These small barrels, extending in length from the muzzle downward to a powder-chamber sliding into the lower end at the breech, are soldered or brazed together, and being arranged so as to fill the inside of the exterior barrel are fixed in it by being soldered or brazed. The tubes or small barrels may be made also by drilling through a solid barrel or bar of metal.

In the breech or lower end of the barrel is a mortise, made through the same from the upper side, as the gun lies leveled horizontally, to the under side, to receive a powder-chamber. This chamber is made nearly square, is exactly fitted to the space made by the mortise, and slides therein. On the upper surface, as it sits in the barrel, is a small projection, to prevent it from falling through, and a tube or pin, with a hole drilled through it, to receive a percussion-cap, which communicates with the hollow of the chamber under. The front plate of this chamber has holes drilled through it to receive the shot or balls, corresponding exactly with the openings or bores of the small barrels. These holes in the front plate of the chamber are made slightly tapering, so that the opening into the chamber is smaller than that into the barrels, against which they rest or slide, and are large enough to receive the shot or balls to be used. The chamber itself contains a cavity sufficiently large to hold a proper charge of powder. It is covered with a flat plate of metal, turning on a pin at one corner, and shutting against another pin at the corner below, to keep it in its place. This cover is of the same size with the body of the chamber. Behind this chamber a screw is placed, turning into a thick piece of metal corresponding in position to the breech-pin of the common gun. The head of the screw is large enough to admit of receiving a small handle or pin, which projects under the barrel so far as to admit of being moved with ease by the finger. A space is cut large enough to admit of turning the screw partly round by moving the pin from one side to the other across the barrel. By this means the screw is made to press hard against the chamber, and to hold it firmly in its place, or, by turning in the opposite direction, to leave the chamber so loose that it can slide out easily.

The barrel may be mounted on a stock or carriage, and furnished with the common lock.

In loading the gun above described the chamber is slipped out. The shot or balls to be used are poured or placed in the holes on the outside of the front plate of the chamber, and pressed into them by the finger. The cover is then turned open and the powder poured into the chamber, which is prevented from running through the holes by the shot which fills them. The cover is again closed, the chamber slipped down into the mortise of the barrel, the percussion-cap placed on the tube, the screw turned up so that the head presses the chamber hard against the lower ends of the small barrels, and the gun is then ready to be discharged.

In the pistol, instead of the sliding chamber, the main barrel filled with the small barrels may be made to screw off. The holder ends of the boxes of the small barrels are sufficiently hollowed out to receive the shot or ball to be used, which is pressed into each. Below these ends a chamber is left for powder, and a thread is cut on the outside of the exterior of the barrel, which screws into a thread cut on the inside of the breech. When the chamber is filled with powder the barrel is screwed on and is ready for use.

In the cannon the chamber may be constructed like that described in the gun, and when loaded may be discharged by a match or lock.

The exterior barrel and the small barrels and chambers may be made of steel, iron, brass, or other metal, and of such size, length, and peculiar form as may best suit the use to which they are intended. Such variations in strength and thickness may be adopted as convenience may require. The small barrels can be rifled, twisted, or straight, or be smooth.

In the construction of the sliding chamber, as it is necessary that the holes in which the shot or ball is placed should correspond with perfect exactness to the bores of the small barrels, they may be made after the chamber has been fitted to the mortise by drilling through the small barrels.

Any number of sliding chambers may be fitted to the same gun. When it is desirable to fire rapidly they may be previously charged and slipped into the gun in quick succession.

The gun described is greatly superior to that in common use for throwing shot. As each shot is projected along a separate barrel, it is sent with greater accuracy to the mark, not being diverted from a direct course by striking against the sides of the barrel, or flattened by contact with other shot. The force with which it is projected is much increased by the action of the powder, exploded in one chamber in equal degree on each shot, and the charge takes effect at greater distance than from the common gun.

With the cannon any number of balls or shot may be thrown through separate barrels, and by rapidly shifting the chambers as they are discharged an almost continuous shower of balls may be thrown on any given point.

If it is found that the balls or shot are too much scattered this difficulty may be remedied by reaming out the muzzle of the gun, so as to make the small barrels in the center a little shorter than those around the exterior. If the shot is too much concentrated they may be made to scatter more by lengthening the small barrels of the center.

The several parts and general appearance of the gun, pistol, or cannon, constructed in the manner described, are delineated in the drawings annexed.

That which I claim as my invention, and which I desire to secure by Letters Patent, is—

The throwing of shot or balls from any number of barrels united together, by exploding powder in a single chamber, substantially in the manner above described.

HENRY HARRINGTON.

Witnesses:
    THEO. B. WESTERN,
    WILLIAM LINCOLN.